(12) United States Patent
Mignot et al.

(10) Patent No.: US 6,321,868 B1
(45) Date of Patent: Nov. 27, 2001

(54) WATERTIGHT APPARATUS CAPABLE OF BEING IMMERSED AND INCLUDING AN ACOUSTIC TRANSDUCER

(75) Inventors: Jean-Pierre Mignot, Peseux; Dominique Dubugnon, Etoy, both of (CH)

(73) Assignee: Asulab S.A., Bienne (CH)

(*) Notice: Subject to any disclaimer, the term of this patent is extended or adjusted under 35 U.S.C. 154(b) by 0 days.

(21) Appl. No.: 09/583,580

(22) Filed: May 31, 2000

(30) Foreign Application Priority Data

Jun. 23, 1999 (CH) .................................................. 1163/99

(51) Int. Cl.[7] ...................................................... G01V 1/04
(52) U.S. Cl. ........................ 181/120; 181/166; 181/207; 181/208; 181/148; 181/149
(58) Field of Search .................................... 181/120, 148, 181/149, 166, 207–209

(56) References Cited

U.S. PATENT DOCUMENTS

| | | | |
|---|---|---|---|
| 3,577,876 | * 5/1971 | Spadini | 368/250 |
| 3,603,427 | * 9/1971 | Sotome | 181/166 |
| 3,779,337 | 12/1973 | Gregory | 181/151 |
| 4,045,954 | * 9/1977 | Ganter et al. | 368/255 |
| 5,243,150 | * 9/1993 | Bank et al. | 181/166 |

FOREIGN PATENT DOCUMENTS

| | | |
|---|---|---|
| 41 14 180 | 11/1992 | (DE) . |
| 899635 | 8/1997 | (EP) . |
| 840047 | 4/1939 | (FR) . |

* cited by examiner

Primary Examiner—Shih-Yung Hsieh
(74) Attorney, Agent, or Firm—Sughrue, Mion, Zinn, Macpeak & Seas, PLLC

(57) ABSTRACT

The present invention concerns a watertight apparatus capable of being immersed in a liquid, for example a watertight watch, including a case (1) with an inner chamber (10) communicating with the exterior, the chamber being separated from the exterior by a membrane (17) which can be deformed, defining, on one side, a non-watertight outer zone and, on the other side, a watertight inner zone, in which is housed, in association with the membrane, an acoustic transducer (22), the membrane being fixed by its peripheral edge (17A) in the chamber (10) and applied via elastic memeber (20) towards its periphery, but at a distance from the edge, against a support surface (12) arranged in the inner chamber (10).

This apparatus includes structure (40) for blocking the vibrations transmitted by the acoustic transducer to the deformable membrane, the structure being inserted between the peripheral fixing zone and the elastic member so as to assure good sound reproduction of the acoustic waves across the entire sound spectrum used.

10 Claims, 3 Drawing Sheets

WATERTIGHT APPARATUS CAPABLE OF BEING IMMERSED AND INCLUDING AN ACOUSTIC TRANSDUCER

The present invention concerns the field of watertight apparatus or equipment capable of being immersed in a liquid, such as water, like for example a watch, said apparatus including a case in which is housed an acoustic transducer, of the microphone or loud-speaker type.

The present invention concerns a watertight apparatus capable of being immersed in a liquid, for example a watertight watch, including a case with an inner chamber communicating with the exterior, said chamber being separated from the exterior by a membrane which can be deformed, defining, on one side, a non-watertight outer zone and, on the other side, a watertight inner zone, in which is housed, in association with said membrane, an acoustic transducer, said membrane being fixed by its peripheral edge in the chamber and applied via elastic means towards its periphery, but at a distance from said edge, against a support surface arranged in the inner chamber.

Mounting acoustic transducers in apparatuses intended to be immersed is already known, and in particular in watches intended to be worn on a user's wrist for the purpose of making watches having additional functions for transmitting and receiving a sound or ultrasonic acoustic signal, for example. The depth of immersion can currently nominally reach about thirty meters or more, and making a completely watertight case, for the purpose of guaranteeing the watertightness of a watch, without any possible communication with the exterior, for all the inner watch components, is already known.

Such an assembly of course guarantees excellent watertightness for the watch. Conversely, the acoustic transducer cannot operate in an optimum manner since the acoustic power which has to be transmitted thereto or emitted thereby is attenuated because of the full, unbroken wall of the case. Such solution can thus only be envisaged if mediocre acoustic quality is accepted.

This is the reason why it has already been proposed, in particular in European Patent Application No. EP-A-0 899 635 by the same Applicant, to make an apparatus capable of being immersed, such as a watch, in which the case containing the acoustic transducer is in communication with the external surroundings of the watch case via an opening. Such an embodiment of course improves the acoustic qualities of the transducer, as regards both reception and transmission of the sound since the sound waves can propagate via the opening arranged in the case, without any significant attenuation or modification. Conversely, such a technical solution requires the assembly of a membrane which can be deformed, on which the acoustic transducer is mounted, said deformable membrane being responsible for sealing all the inner components of the case relative to the external opening.

As was stated previously, the apparatus according to European Patent Application No. EP-A-0 899 635 provides a significant improvement in the general acoustic qualities of the acoustic transducer. However, it has been able to be shown that a device of this kind cannot work in an optimum manner across the entire sound spectrum used. Thus, the appearance of signal distortions and attenuation in proximity to certain sound frequencies has been observed. The appearance of deterioration in the acoustic features of the apparatus provided with a deformable membrane in proximity to such a frequency range can result from multiple causes, such as those linked to the existence of a resonance frequency of the elastic element holding the membrane in place, or even to the existence of a vibration of the transducer against the bottom of the membrane deformation chamber. Other reasons may of course be evoked, without the origin thereof being able to be determined exactly.

The object of the invention is consequently to provide a remedy to the various drawbacks mentioned previously, and to provide a new watertight apparatus able to be immersed in a liquid and wherein the acoustic transducer associated with a sealing deformable membrane is able to assure improved reproduction of the sound waves across the entire sound spectrum used.

Another object of the invention is to provide a new watertight apparatus allowing the sound waves to be reproduced at a high level across the entire sound spectrum used, using particularly simple and tested technical means.

Another object of the invention is to provide a new watertight apparatus provided with an acoustic transducer able to reproduce optimum acoustic quality across the entire sound spectrum used while being economical to manufacture, and whose various internal components can easily be set in place.

The objects assigned to the invention are achieved using a watertight apparatus, capable of being immersed in a liquid, for example a watertight watch, with a case including an inner chamber communicating with the exterior, said chamber being separated from the exterior by a membrane which can be deformed defining, on one side, an outer non watertight zone and, on the other side, an inner watertight zone wherein an acoustic transducer is housed, in association with said membrane, said membrane being secured by its peripheral edge in the chamber to form a peripheral fixing zone elastically applied by elastic means towards the periphery thereof, but at a distance from said edge, against a support surface arranged in the inner chamber, characterised in that it includes means for blocking the vibrations transmitted by the acoustic transducer to the deformable membrane, said means being inserted between the peripheral fixing zone and the elastic means.

Other advantages and peculiarities of the invention will be explained in more detail in light of the following description, with reference to the drawings annexed hereinafter, given purely by way of illustrative and non-limiting example, in which.

In the following description, the invention will be illustrated in its application to a watertight apparatus capable of being immersed in a liquid, formed by a timepiece consisting of a wristwatch. It is nonetheless clear that such a presentation can in no way be considered a limitation of the invention to this specific type of apparatus or equipment, it being understood that the invention can be applied in a general way to any apparatus, which is generally portable and of small dimensions, provided that it includes at least one acoustic transducer and is capable of being immersed in a liquid, in particular water, to a predetermined depth. Moreover, in the preferred example of the wristwatch described hereinafter, the acoustic transducer will advantageously be formed by a loudspeaker, it being understood that in its place, any type of acoustic transducer could be used without thereby departing from the scope of the invention, the acoustic transducer also being able for example to be a microphonic or other transducer.

Figure 1:
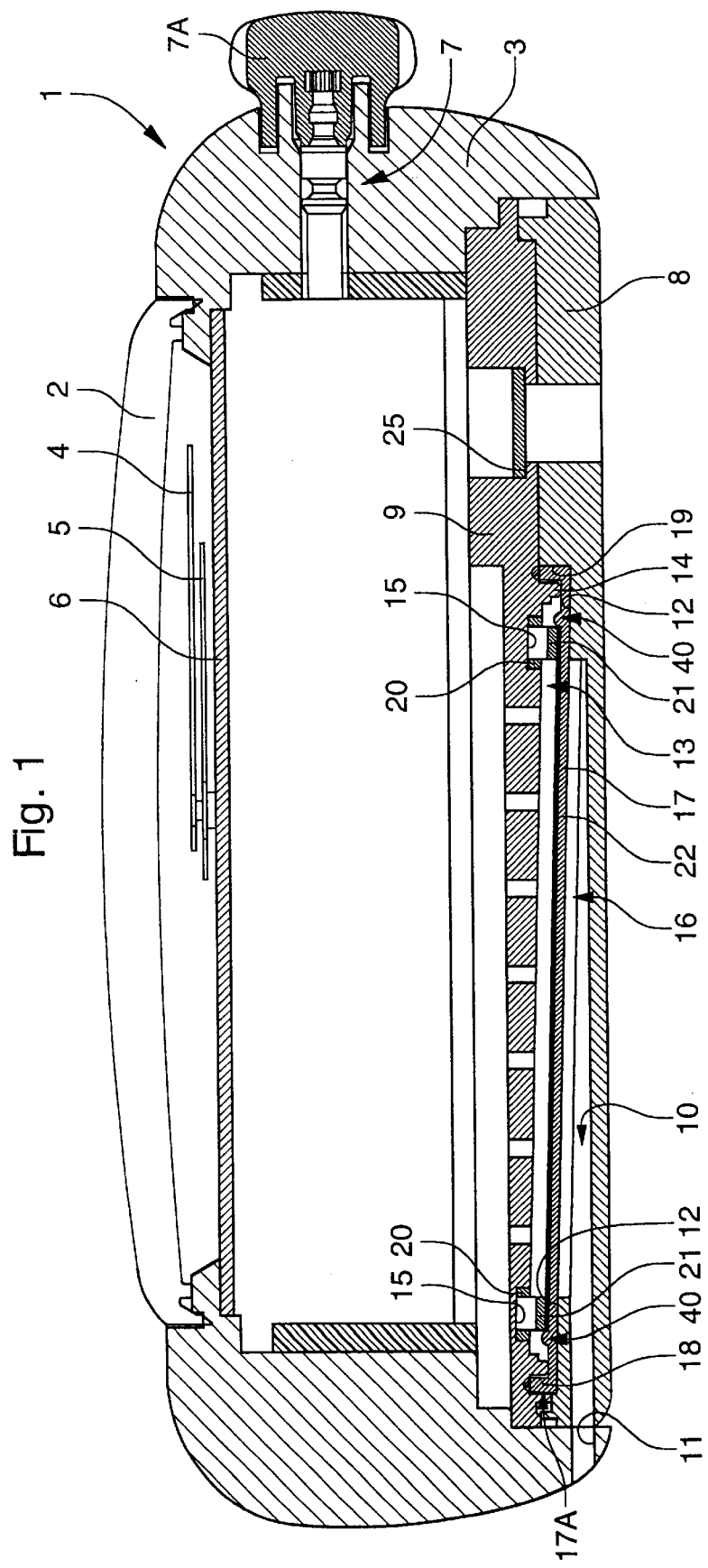
FIG. 1 shows a longitudinal transverse cross-section of a timepiece designed according to the invention and provided with an acoustic transducer and a deformable membrane arranged according to the invention.

FIG. 1 shows a general longitudinal transverse cross-section of case 1 of a wristwatch (not shown in its entirety in the Figures). Case 1 includes in a conventional manner, a transparent crystal 2 mounted on the top portion of a body 3 forming the general frame of case 1. The latter also includes a pair of hands 4, 5 mounted so as to move above a dial 6 which is mounted on body 3. In a conventional manner, case 1 also includes all the parts of wristwatch operating mechanism 7 (not shown in the Figures), and in particular a timesetting crown 7A.

All the internal operating components of the wristwatch, such as the electronic integrated circuit, the quartz, the miniature motor, the wheels and gear trains, are well known to those skilled in the art of the technical field being considered, and consequently will not be described in more detail.

By way of preferred, but in no way limiting application of the invention, a wristwatch according to the invention could be provided with a microphone transducer or a loudspeaker to form a portable telephone watch.

The invention of the present Patent Application constitutes an improvement to European Application No. EP-A-0 899 635 by the same Applicant, of which the description and all the technical data figuring in particular in the Figures is considered as incorporated by reference in the description of the present invention.

Case 1 includes in its bottom portion a back cover 8 delimiting its bottom portion. Back cover 8 is mounted on body 3 and delimits an inner chamber 10 of case 1 communicating with the exterior of case 1 through a channel 11 opening out for example laterally.

Advantageously, back cover 8 has towards its periphery and on its top portion a support surface 12, which is for example circular, slightly inclined with respect to the axis of inner chamber 10.

Case 1 also includes a support part 9, which is for example circular and of a shape which is generally paired and matched to back cover 8, to rest thereupon. Support part 9 is mounted substantially coaxial to inner chamber 10 and has, substantially in its central portion, a recess 13, for example also of generally circular shape. This recess 13 constitutes a deformation chamber, edged with a peripheral rib 14 with a rounded head contiguous to an annular groove 15 situated radially inside with respect to rib 14.

Inner chamber 10 is separated from the exterior of case 1 by a deformable membrane 17, made of plastic material, thus defining, on one side an outer non watertight zone in communication with channel 11, and on the other side, an inner watertight zone incorporating the volume defined by recess 13. In the inner watertight zone, namely in the volume of recess 13, is housed, in association with membrane 17, a transducer element 22, for example a loudspeaker of the piezoelectric type, or an acoustic receiver (microphone). Transducer element 22 is advantageously directly mounted on and supported by deformable membrane 17, for example by bonding or overmoulding, or even by moulding during the manufacture of deformable membrane 17.

Transducer element 22 forms with deformable membrane 17 a unit called "transducer unit 16".

Advantageously, deformable membrane 17 is fixed in proximity to a peripheral fixing zone, and for example by its peripheral edge 17A, advantageously including a peripheral edge 18, for example by bonding to a peripheral lateral wall 19 arranged around support surface 12, respectively on back cover 8 and support part 9. In this way, membrane 17 assures the watertightness of the inside of case 1 with respect to the exterior, while being free to be deformed in its central zone situated inside the inner edge of support surface 12.

Transducer unit 16 is also applied elastically by elastic means 20 in the direction of and against support surface 12 in order to allow the lowest frequency vibration mode of the active part of transducer unit 16.

Elastic means 20 elastically applies transducer unit 16 against support surface 12 in a zone adjacent to its periphery but at a certain distance from peripheral edge 17A so as to leave free the space extending between, on the one hand, the periphery of deformable membrane 17 and its peripheral fixing zone and, on the other hand, elastic means 20.

Elastic means 20 can be formed by any suitable means, and for example by a ring housed in groove 15 and provided with elastic lugs 21 distributed angularly around transducer 22. Since elastic lugs 21 are all under tension, they thus elastically apply transducer unit 16 against support surface 12 while strictly limiting the zone of the membrane able to vibrate freely.

According to an important feature of the invention, the apparatus includes means for blocking vibrations 40 transmitted by transducer element 22 to a region between the peripheral fixing zone and the elastic means of the deformable membrane 17, said means being inserted between peripheral edge 17A and elastic means 20. In other words, vibration blocking means 40 are arranged beyond elastic means 20, considering the outer radial direction and underneath the peripheral fixing zone of the membrane.

As a result of this arrangement, it has appeared that the insertion of a barrier in the free space located between the peripheral fixing zone of deformable membrane 17 and elastic means 20 allow most of the vibrations able to be transmitted to the peripheral part of membrane 17 to be blocked or eliminated beyond elastic means 20. In all cases, it appears that this embodiment prevents the vibrations propagating to the peripheral part of the membrane, while considerably reducing the vibration frequency of this peripheral zone of the membrane to a value outside the useful frequency range.

According to a first feature of the invention, vibration blocking means 40 are an integral part of deformable membrane 17.

Figure 2:
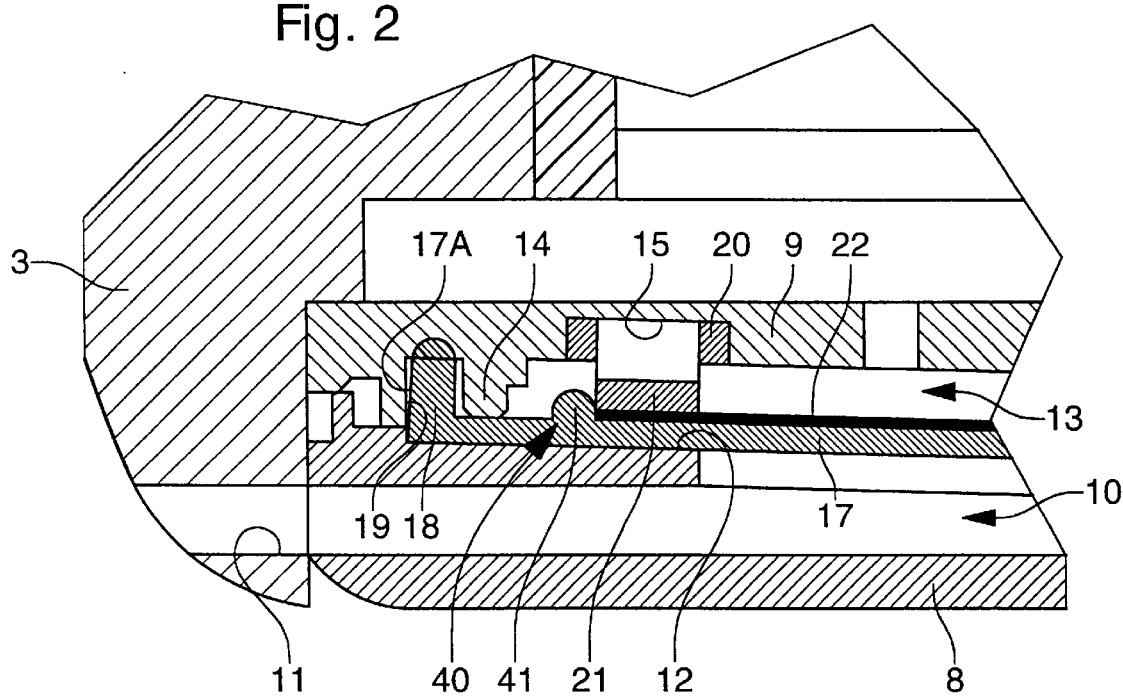
FIG. 2 shows, along a partial longitudinal transverse cross-section, an enlarged detail of FIG. 1 showing a first alterative embodiment according to the invention.

As shown in FIG. 2, vibration blocking means 40 are advantageously formed by a peripheral rib 41 rising from the top face of deformable membrane 17. According to this variant, peripheral rib 41 forms a bulge of material arranged directly on the periphery of acoustic transducer 22.

By way of additional variant (not shown in the Figures), vibration blocking means 40 may be formed by a zone of deformable membrane 17 which has a greater density relative to the rest of said membrane.

By way of complementary variant (not shown in the Figures), vibration blocking means 40 may also be formed by a zone of deformable membrane 17 which has greater rigidity relative to the rest of said membrane. The rigidification of the membrane towards its peripheral region can be obtained either by means of an additional moulded structure, or embedded in the material of deformable membrane 17, or conversely by a localised variation in its composition.

Figure 3:
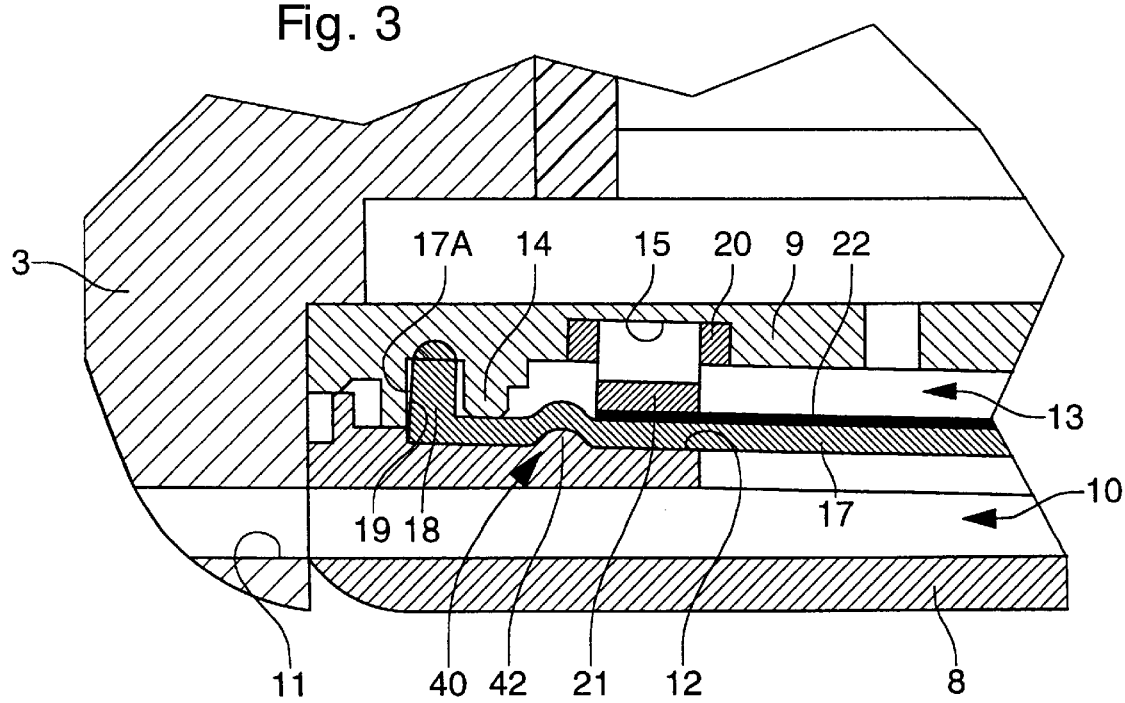
FIG. 3 shows, along a partial longitudinal transverse cross-section, an embodiment detail according to a second variant of the invention.

FIG. 3 shows another alternative embodiment of the invention in which vibration blocking means 40 are formed by a rib 42 extending from support surface 12 to place deformable membrane 17 under tension. According to this variant, vibration blocking means 40 are formed by an element distinct from deformable membrane 17.

Figure 4:
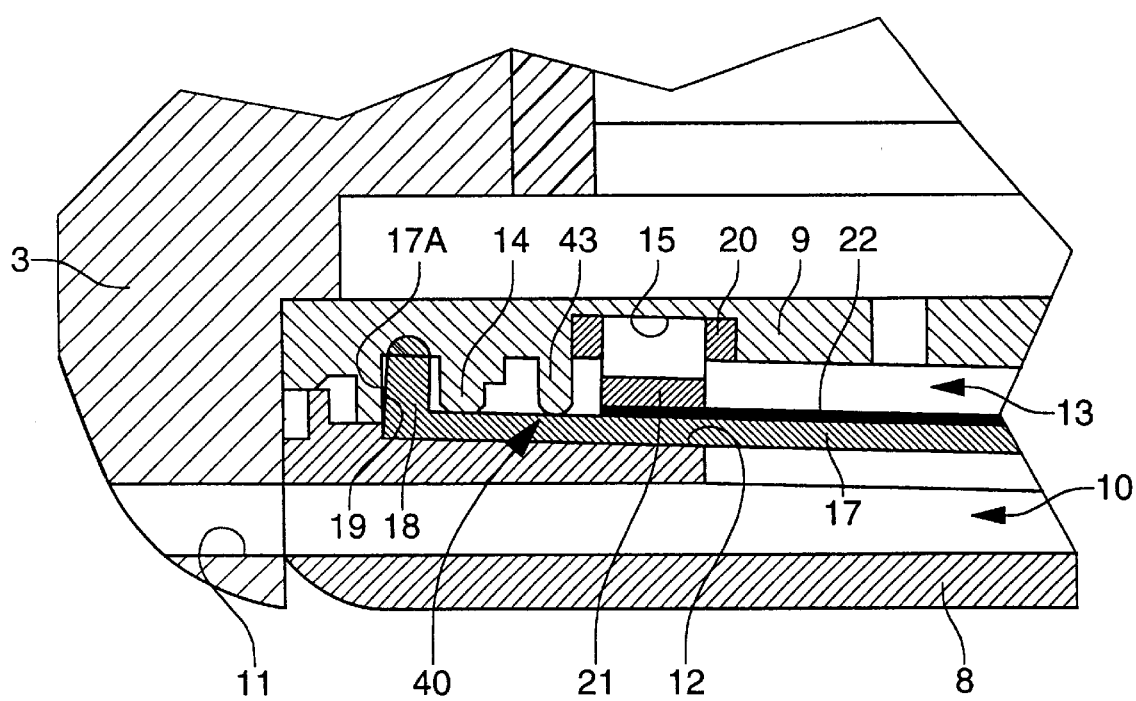
FIG. 4 shows, along a partial longitudinal transverse cross-section, an embodiment detail according to a third variant of the invention.

FIG. 4 shows a complementary variant of the invention in which vibration blocking means 40 are formed by a rib 43 extending from the top part of the inner watertight zone, namely of support part 9, to rest on deformable membrane 17 in order to press it against support surface 12.

In all the alternative embodiments considered, vibration blocking means 40 may extend continuously over the entire peripheral length of deformable membrane 17, or conversely extend in a non-continuous manner, the essential being that an absence in deterioration in the acoustic features of the equipment can be observed and confirmed whatever the frequency zones considered.

The beneficial results relating to maintaining excellent transmission or reception of a broad sound spectrum figure in the table hereinafter. This table presents, in a first part, the results obtained by means of a reference apparatus which differs from the present invention only in the absence of vibration blocking means 40. In a second part, this table presents the beneficial effect of inserting vibration blocking means 40 formed by a peripheral rib 41. The penultimate column of this table presents the ratio, expressed in percentages, of the power supplied at the second harmonic (2 harm) of the excitation frequency to the power supplied at the excitation frequency of transducer unit 16. The last column presents this same ratio for the 3rd harmonic (3 harm) of the excitation frequency.

In the particular case which is presented here, the appearance of strong distortions in the acoustic signal at an excitation frequency close to 1500 hertz was thus observed. It will be noted however that the frequency in proximity to which such deterioration occurs in the acoustic qualities of the apparatus is particularly dependent on the dimensions of the latter. In the particular case, the attenuation of the vibrations is particularly sensitive for the apparatus according to the invention.

|  | Volt (V) | Frequency (Hz) | db acous. | 2 harm % | 3 harm % |
| --- | --- | --- | --- | --- | --- |
| Reference | 5.00 | 1500.00 | 84.02 | 32.52886 | 12.48344 |
|  | 5.00 | 1500.00 | 86.35 | 16.32474 | 6.75762 |
|  | 5.00 | 1500.00 | 92.47 | 52.30959 | 17.92321 |
|  | 5.00 | 1500.00 | 92.92 | 15.47401 | 5.13148 |
| Invention (with rib) | 5.00 | 1500.00 | 85.93 | 2.38960 | 1.65342 |
|  | 5.00 | 1500.00 | 86.98 | 0.64973 | 4.53325 |
|  | 5.00 | 1500.00 | 86.69 | 0.60092 | 7.35284 |

What is claimed is:

1. A watertight apparatus capable of being immersed in a liquid, comprising a case with an inner chamber communicating with the exterior, said chamber being separated from the exterior by a deformable membrane defining, on one side, a non-watertight outer zone and, on the other side, a watertight inner zone, in which is housed, in association with said membrane, an acoustic transducer, said membrane being fixed by its peripheral edge in the chamber to form a peripheral fixing zone and applied via elastic means towards its periphery, but at a distance from said edge, against a support surface arranged in the inner chamber, said apparatus further comprising means for blocking the vibrations transmitted by the acoustic transducer to a region between the peripheral fixing zone and the elastic means of the deformable membrane.

2. The apparatus according to claim 1, wherein the vibration blocking means are an integral part of the deformable membrane.

3. The apparatus according to claim 2, wherein the vibration blocking means are formed by a peripheral rib rising from the top face of the deformable membrane.

4. The apparatus according to claim 2, wherein the vibration blocking means are formed by a zone of the deformable membrane which has a greater density relative to the rest of said membrane.

5. The apparatus according to claim 2, wherein the vibration blocking means are formed by a zone of said deformable membrane which has a greater rigidity relative to the rest of said membrane.

6. The apparatus according to claim 1, wherein the vibration blocking means are formed by a distinct element of the deformable membrane.

7. The apparatus according to claim 6, wherein the vibration blocking means are formed by a rib extending from the support surface to place the deformable membrane under tension.

8. The apparatus according to claim 6, wherein the vibration blocking means are formed by an additional ring resting on the deformable membrane to press it against the support surface.

9. The apparatus according to claim 6, wherein the vibration blocking means are formed by a rib extending from the top part of the inner watertight zone to rest on the deformable membrane to press it against the support surface.

10. The apparatus according to claim 1, wherein the vibration blocking means extend on the periphery of the deformable membrane.

* * * * *